United States Patent [19]

Leibhard

[11] Patent Number: 4,464,076
[45] Date of Patent: Aug. 7, 1984

[54] EXPANSION DOWEL ASSEMBLY

[75] Inventor: Erich Leibhard, Munich, Fed. Rep. of Germany

[73] Assignee: Hilti Aktiengesellschaft, Schaan, Liechtenstein

[21] Appl. No.: 392,252

[22] Filed: Jun. 25, 1982

[30] Foreign Application Priority Data

Jun. 29, 1981 [DE] Fed. Rep. of Germany ....... 3125457

[51] Int. Cl.³ ................................................ F16B 2/14
[52] U.S. Cl. .................................... 403/297; 403/358; 403/370; 403/371; 403/409; 411/76
[58] Field of Search ............... 294/94, 96, 89; 411/75, 411/76, 78, 79, 80; 403/297, 374, 358, 409, 370, 371

[56] References Cited

U.S. PATENT DOCUMENTS 3,117,483  1/1964  Brown ..................................... 411/76
3,296,764  1/1967  Tremblay ........................... 411/79 X
3,436,106  4/1969  Luenberger .......................... 403/356

FOREIGN PATENT DOCUMENTS 1321479  6/1973  United Kingdom .

Primary Examiner—Cornelius J. Husar
Assistant Examiner—Joseph A. Fischetti
Attorney, Agent, or Firm—Toren, McGeady and Stanger

[57] ABSTRACT

An expansion dowel assembly is formed of an axially extending dowel body and an expansion member. The dowel body has a support surface inclined relative to the axis of the dowel body along which the expansion member can be displaced for anchoring the dowel assembly in an opening such as a borehole. At least a portion of the support surface is in the form of a groove extending in the axial direction of the dowel body and the bottom of the groove is inclined so that the expansion member is forced radially outwardly away from the axis of the dowel body as it is displaced through the groove.

11 Claims, 5 Drawing Figures

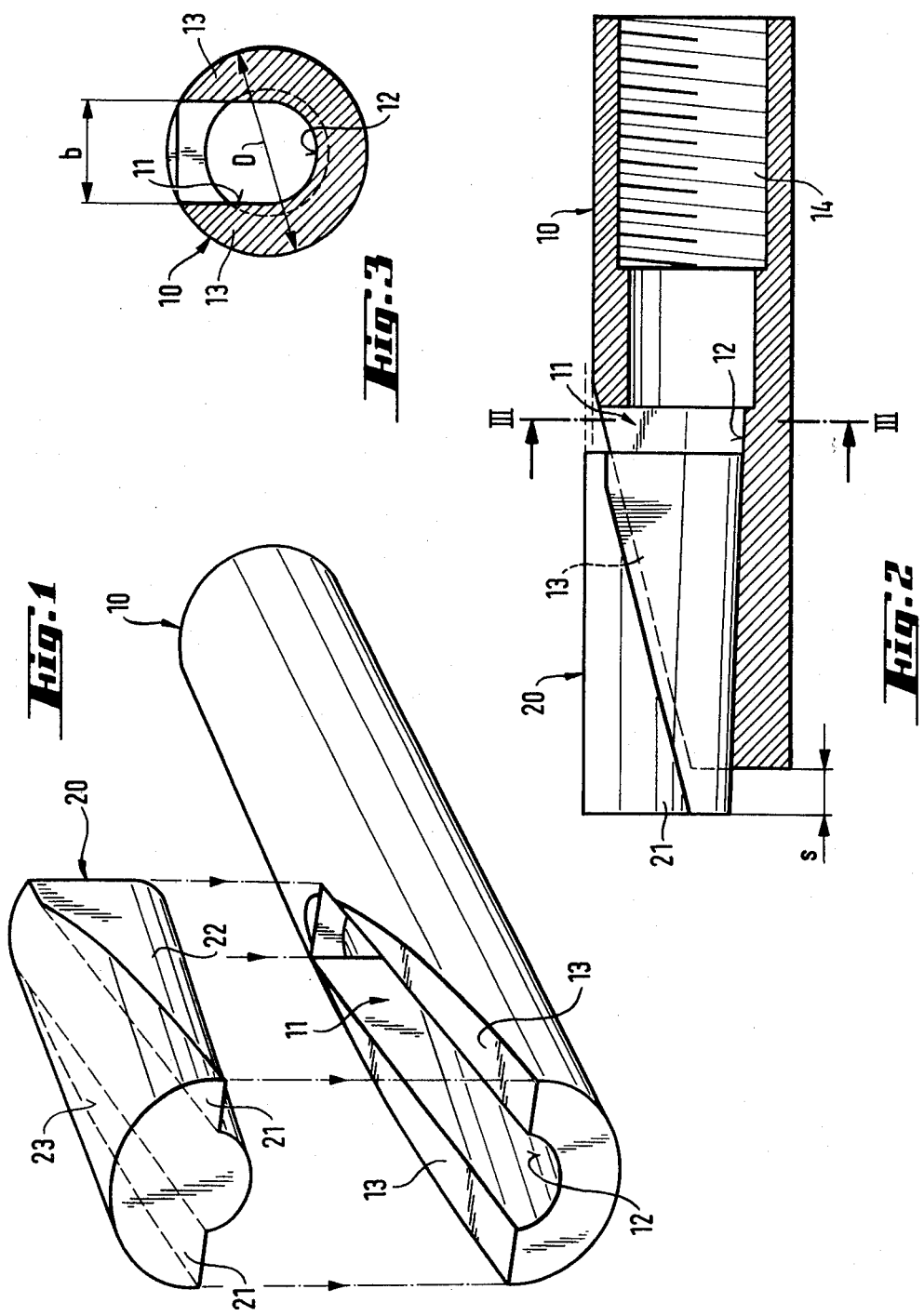

EXPANSION DOWEL ASSEMBLY

SUMMARY OF THE INVENTION

The present invention is directed to an expansion dowel assembly including a dowel body and an expansion member fitted together with the dowel body so that it can be driven axially forward relative to the dowel body into a spreading or anchoring position. At its rear end the dowel body has engagement means for applying axially acting forces to the body. The front part of the dowel body forms a supporting surface for the expansion member and the supporting surface is inclined relative to the axis of the dowel body so that as the expansion member is displaced over the support surface relative to the dowel body it is forced radially outwardly away from the axis of the dowel body. Initially, the combination of the dowel body and the expansion member form a cylindrically shaped outer peripheral surface prior to the displacement of the expansion member relative to the dowel body into the anchored position.

Expansion dowels can be differentiated between those with and those without a post or after-spreading characteristic. A post-spreading characteristic means that the dowel assembly continues to spread or expand when a force is applied to the dowel body tending to pull it out of the opening in which it is anchored. Such a characteristic is desirable, particularly when the dowel assembly supports dynamic loads. The post-spreading feature, however, can also result under the effect of static load and embodies considerable advantages such as increasing the safety of the assembly.

Post-spreading is generally achieved when the dowel body widens in one or several directions towards its front end with the expansion member being correspondingly narrowed. In a known expansion dowel assembly, the expansion member is wedge-shaped and provided with a narrow edge directed toward the front end of the assembly, and the dowel body is provided with a corresponding recess for the member. The expansion member is supported on a support surface inclined with respect to the axis of the dowel body so that axial displacement of the expansion member causes it to move radially outwardly away from the dowel body axis. Since the support surface is planar, it affords no lateral guidance for the expansion member. As a result, during movement, the expansion member can be eccentrically offset.

In another known expansion dowel assembly, the dowel body is in the form of a hollow cylinder. The expansion member is supported only along its edge by the support surface formed in the area of the wall of the dowel body. Consequently, the exapnsion member can be deformed by the expansion pressure generated during the anchoring operation.

Therefore, the primary object of the present invention is to provide an expansion dowel assembly having a post-spreading characteristic due to the lateral guidance and centrally arranged support of the expansion member in the dowel body so that optimum load distribution and high anchoring values are achieved.

In accordance with the present invention, the support surface of the expansion member is formed at least in part by the bottom of a groove centrally arranged within and extending in the axial direction of the dowel body. As a consequence, the expansion member is guided by the side walls of the groove. Due to the central arrangement of the support surface, the expansion member is supported in the region where the highest spreading forces occur. Basically, the groove may be of any shape. For the guidance of the expansion member, however, it is advantageous if the groove has a U-shaped transverse cross-section. The sides of the U-shaped groove may be parallel with respect to one another or they may converge inwardly or diverge outwardly. In view of production techniques, sides which extend parallel to one another would be most advantageous.

As the expansion dowel is being spread and anchored, in accordance with the present invention a very high expansion pressure results in the region of the support surface. To enable the distribution of the expansion pressure it is advantageous if the bottom of the groove is arc-shaped in transverse section. Accordingly, the support surface is curved and the expansion member is supported in the dowel body as in a bearing shell.

As the expansion dowel assembly is being anchored, the expansion pressure must be absorbed by the support surface. To prevent overstressing, it is advantageous if the width of the groove is in the range of 0.3 to 0.7 times the outside diameter of the dowel body and preferably its width should be half that of the outside diameter. If such a dimensional relationship is maintained, the dowel body will not be weakened and no disadvantageous effects will result.

In the known expansion dowel assembly, the cross-sectional reduction of the dowel body is the greatest at the rear end of the support surface. Such a reduction in the cross-section results in a considerable notch effect. To prevent such an occurrence at least partially, it is advantageous if the side walls of the groove decrease in height from the rear end toward the front end of the dowel body. Such an arrangement results in a cross-sectional reduction due to the decrease in height of the side walls and it also permits a widening of the cross-section due to the arrangment of the side walls of the groove. By a proper adjustment of these two features, it is possible that the cross-sectional area of the dowel body remains uniform over the axial extent of the support surface.

For the distribution of the expansion pressure it is advantageous that the expansion element has, between side surfaces which increase in width toward the front end in accordance with the similar configuration of the side walls of the dowel body limiting the groove, a ridge projecting outwardly from the side walls and having a transverse profile corresponding to the profile if the groove in the dowel body. As a result, the ridge extends into and is guided within the groove of the dowel body. The side surfaces of the expansion member extending along each side of the ridge afford an enlargement of the surface of the expansion member in contact with the surface of the borehole or opening into which the expansion dowel assembly is placed. As a result, the surface of the expansion member is greatest where, according to experience, the greatest expansion pressure occurs. The surface of the expansion member arranged to contact the surface of the borehole or opening may extend at the front end of the dowel assembly over half of the dowel periphery.

It is advantageous for a simple manufacturing operation of the dowel body and the expansion member if the groove in the dowel body is V-shaped in transverse section. A V-shaped groove has only two guide surfaces each of which is a planar surface. The V-shaped arrangement of the guide surfaces also provides a centering of the expansion member in the dowel body.

Basically, the guide surfaces may be arranged with any inclination. For the optimum distribution of the developed forces and of the pressures developed at the contact surfaces, it is advantageous for the angle defined by the V-shaped groove to be in the range of 90° to 120°. An angle in this range affords an adequately large surface for the expansion member in contact with the surface of the borehole into which the dowel assembly is placed. The notch effect of the expansion member is thereby kept within allowable limits.

Where there are larger diameter differences between the dowel body and the borehole, and also for higher loads, the dowel body along the length of the groove can be provided with an axially extending slot. Such a slot permits the dowel body to be radially expanded. When combined with the V-shaped groove, the longitudinal slot in the dowel body results in an expansion which acts in three directions with the parts of the dowel body formed by the longitudinal slot being spread apart by the displacement of the expansion member relative to the dowel body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invetion.

BRIEF DESCRIPTION OF THE DRAWING

In the drawing:

FIG. 1 is a perspective view of an expansion dowel assembly embodying the present invention with the assembly made up of a dowel body and an expansion member and the expansion member is shown displaced outwardly from the dowel body;

FIG. 2 is an axially extending sectional view through the dowel body as shown in FIG. 1 with the expansion member engaged within the dowel body and driven partially forward through the dowel body;

FIG. 3 is a cross-sectional view of the expansion dowel assembly taken along the line III—III in FIG. 2;

DETAILED DESCRIPTION OF THE INVENTION

Figure 5:
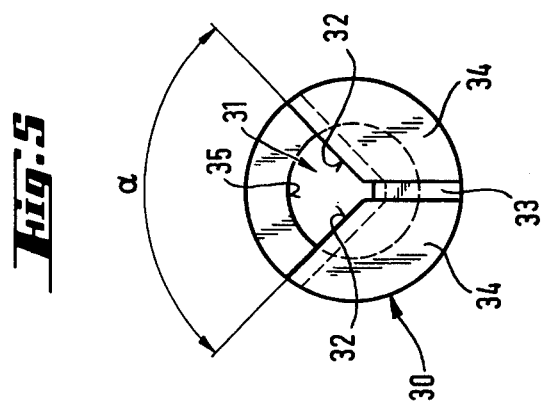
FIG. 5 is a front view of the dowel body as shown in FIG. 4.

In FIG. 1 the expansion dowel assembly is made up of a dowel body 10 and an expansion member 20. As viewed in FIGS. 1 and 2 the left-hand end of the dowel body 10 and the expansion member 20 is the front end of the right-hand end is the rear end. For a portion of its axial length, the dowel body is cylindrically shaped, however, intermediate its front and rear ends the dowel body is cut away along a planar surface inclined from the intermediate location toward the axis of the dowel body to the front end. From the front end of the dowel body of the intermediate location a groove 11 is formed which is centrally located in the dowel body and extends in the axial direction. As can be seen best in FIG. 3, the groove 11 has U-shaped transverse cross-section. The bottom 12 of the groove 11 is arc-shaped in transverse section and forms a support surface for the expansion member 20. The bottom 12 is inclined upwardly toward the longitudinal axis from the intermediate location to the front end of the dowel body. As a result, the wall of the dowel body along the bottom 12 of the groove 11 increases in thickness toward the front end. The side walls 13 of the groove decrease in height as they approach the front end of the dowel body. Because of the circular shape of the dowel body, the top surfaces of the side walls 13 increase in width from the intermediate location to the front end of the body. The expansion member 20 is shown spaced upwardly above the dowel body to afford a more complete illustration of the overall configuration of the member. The expansion member 20 has two downwardly facing sides 21 which increase in width from the rear end to the front end similar to the increase in width of the top surfaces of the walls 13 of the dowel body which define the opposite sides of the top of the groove 11. A ridge 22 extends downwardly from both of the sides 21 and has a shape complementary to the shape of the bottom 12 of the groove 11, that is, the surface of the ridge 22 is arc-shaped. Further, the surface 23 of the expansion member 20 forming the outer periphery of the dowel assembly, when it is positioned on the dowel body, increases in area from the rear end to the front end of the expansion member. Moreover, the surface 23 is circularly shaped having the same radius as the outside surface of the dowel body 10. The ridge 22 of the dowel body fits into and in contact with the groove 11 in the dowel body 10. Consequently, the expansion member 20 is supported on the bottom 12 of the groove 11 and is slidable in the axial direction relative to the dowel body. When the dowel body 10 and the expansion member 20 are combined together for insertion into a borehole or opening before the expansion member is displaced axially relative to the dowel body, they form a circular or cylindrically shaped cross-section.

A longitudinal section through the dowel body in accordance with the present invention is shown in FIG. 2 and from the intermediate location where the groove 11 commences, toward its rear end, the dowel body is formed as a sleeve. In position ready to be inserted, the expansion member is fitted into the groove 11 and its rear end would be located against the sleeve-like portion of the dowel body. As viewed in FIG. 2, the expansion member has been axially displaced by a distance s relative to the dowel body 10. Since the bottom 12 of the groove 11 is inclined toward the axis of the dowel, the expansion member 20 is radially offset as it moves relative to the dowel body. Adjacent its rear end, a female thread is provided in the dowel body. The female thread 14 affords engagement means for applying axially directed forces to the dowel body. The displacement of the expansion element can be effected by means of a setting tool placed through the bore within the sleeve-like part of the dowel body extending from its rear end. If a load is attached to the dowel body by means of the female thread 14, tending to pull the dowel body axially away from the expansion member, after or post-spreading occurs. As is shown in FIG. 2, the side walls 13 of the dowel body limiting the groove 11 decrease in height toward the front end of the body. With the arrangement of the groove, though the side walls decrease in height, the increase in wall thickness of the bottom of the groove 11 affords a practically uniform transverse cross-section of the dowel body between the intermediate location and the front end.

From the cross-sectional view of the dowel body 10 afforded in FIG. 3, the U-shaped configuration of groove 11 is evident. The bottom 12 of the groove is arc-shaped in transverse section. The inside surface of the side walls 13 extend parallel to one another. The width b of the groove 11 is approximately 0.5 times the outside diameter of the dowel body 10. Due to this dimensional ratio it is guaranteed that an adequately large area support surface is provided for the expansion member 20 and, at the same time, the remaining cross-sectional area of the dowel body does not decrease.

Figure 4:
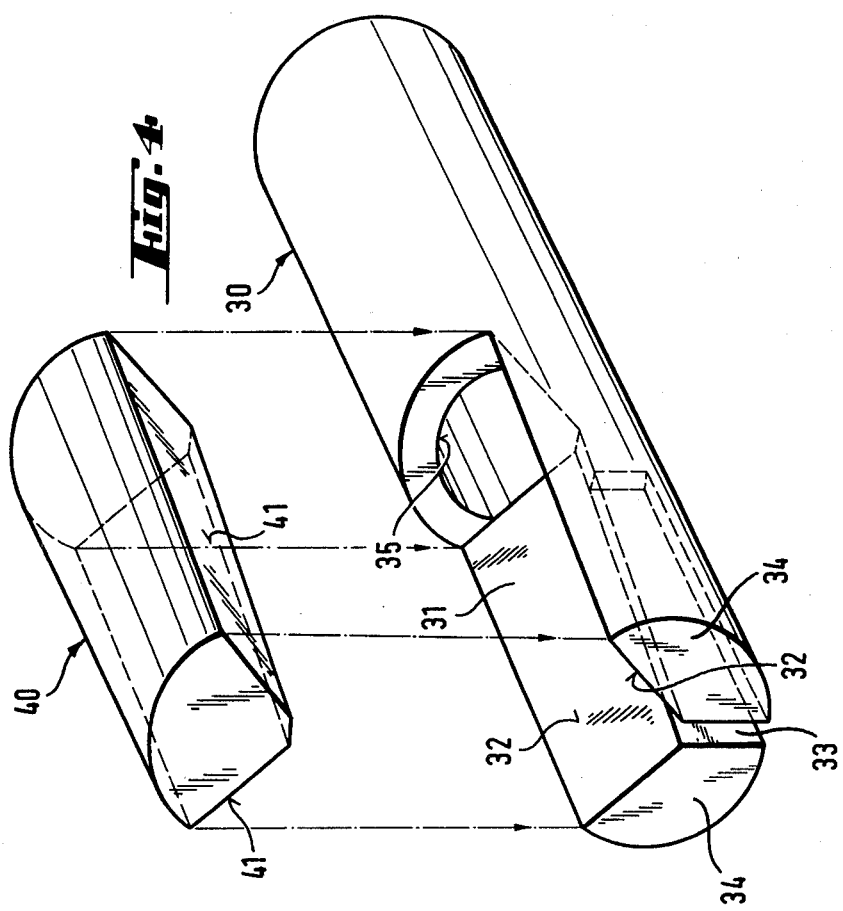
FIG. 4 is a perspective view, similar to FIG. 1, of another embodiment of the expansion dowel assembly incorporating the present invention with the expansion member shown spaced outwardly from the dowel body.

In FIGS. 4 and 5 the expansion dowel assembly is formed by a dowel body 30 and an expansion member 40. Between an intermediate location between the front and rear ends of the body, and the front end, a V-shaped groove 31 is formed and extends parallel to the axis of the dowel body. The bottom of the groove 31 is inclined upwardly toward the axis of the dowel body from the intermediate location to the front end. Groove 31 has a pair of angularly disposed support surfaces 32 for the expansion member 40 and the support surfaces are spaced apart by an angle α of approximately 90°. A longitudinal slot 33 extends downwardly from the bottom of the groove 31 to the outside surface of the dowel body and from the front end to a location spaced closely from the intermediate location where the groove commences. Slot 33 divides the dowel body into two sides 34 which can be spread apart. A bore 35 is provided in the dowel body from its rear end to the intermediate location where the groove commences. As with the embodiment in FIGS. 1–3, a setting member can be placed through the bore 35 into contact with the expansion member 40 for driving it forwardly relative to the dowel body.

As viewed in transverse cross-section, expansion member 40 is wedge-shape with a configuration complementary with that of the groove 31 and the guide surfaces 41 of the expansion member are disposed in sliding contact with the support surfaces 32 in the groove. The transverse cross-section of the expansion element decreases from its rear end toward its front end. When the dowel assembly is placed into a borehole, and the expansion member 40 is displaced axially with respect to the dowel body, an expanding force is generated by the guide surfaces 41 acting on the support surfaces 32 tending to spread apart the sides 34 of the dowel body 30. Accordingly, the spreading action within the borehole takes place in three directions, that is, the direction of the expansion member 40 and of the two sides 34.

The front view of the dowel body 30 displayed in FIG. 5 shows the V-shaped configuration of the groove 31. The angle α between the support surfaces 32 is preferably in the range of 90° to 120°. Further, the inclined arrangement of the support surfaces 32 from the intermediate location in the front end can be noted in FIG. 5.

While specific embodiments of the invention have been shown and described in detail to illustrate and application of the inventive principles, it will be understood that the invention may be embodied otherwise without departing from such principles.

I claim:

1. An exposure dowel assembly comprising an axially extending dowel body having a front and a rear end with the front end arranged to be inserted first into an opening into which the dowel assembly is to be inserted, and an axially extending expansion member having a front end and a rear end and arranged to be supported on said dowel body and to be displaced in the axial direction of the dowel body away from the rear end of said dowel body for anchoring said dowel body in the opening, said dowel body having engagement means adjacent the rear end thereof for applying axially directed forces to said dowel body, said dowel body having an axially extending support surface for said expansion member extending from a location intermediate the front and rear ends of said dowel body toward the front end and inclined at an angle to the axis of said dowel body, said dowel body and expansion member being engageable with one another to form an axially extending cylindrically shaped outer peripheral surface so that the dowel assembly can be inserted into a corresponding cylindrically shaped opening prior to being expanded, wherein the improvement comprises that said support surface is formed at least in part by a centrally arranged groove extending inwardly into and in the axial direction of said dowel body from the location intermediate the front and rear ends of said dowel body toward the front end thereof and the bottom of said groove being inclined relative to the axis of said dowel body for displacing said expansion member radially outwardly from the axis of said dowel body as said expansion member is displaced along said groove in the direction toward the front end of the dowel body, said groove having oppositely disposed side walls extending upwardly from the bottom of said groove and said side walls decreasing in height from the intermediate location to the front end of said dowel body, and said expansion member is shaped to fit into said groove in said dowel body in contact with said side walls in said groove and with said bottom and in the insertion condition of said expansion dowel assembly the front ends of said dowel body and expansion member are arranged transversely of the axis of said dowel body and the lateral outer surfaces of said dowel body and expansion member in the insertion condition form a continuous cylindrical surface.

2. An expansion dowel assembly as set forth in claim 1, wherein said groove is U-shaped in cross-section transverse to the axial direction of said dowel body.

3. An expansion dowel assembly as set forth in claim 1 or 2, wherein the bottom of said groove is arc-shaped in transverse section.

4. An expansion dowel assembly as set forth in claim 3, wherein the width of said groove is in the range of 0.3 to 0.7 times the outside diameter of said dowel body.

5. An expansion dowel assembly as set forth in claim 4, wherein the width of said groove is 0.5 times the outside diameter of said dowel body.

6. An expansion dowel assembly, as set forth in claim 1, wherein said groove is V-shaped in cross-section transversely of the axis of said dowel body.

7. An expansion dowel assembly, as set forth in claim 6, wherein said groove has a pair of angularly spaced side surfaces with the angular spacing of said side surfaces being in the range of 90° to 120°.

8. An expansion dowel assembly comprising an axially extending dowel body having a front end and a rear end with the rear end arranged to be inserted first into an opening into which the dowel assembly is to be inserted, and an axially extending expansion member having a front end and a rear end and arranged to be supported on said dowel body and to be displaced in the axial direction of the dowel body away from the rear end of said dowel body for anchoring said dowel body in the opening, said dowel body having engagement means adjacent the rear end thereof for applying axially directed forces to said dowel body, said dowel body having an axially extending support surface for said expansion member extending from a location intermediate the front and rear ends of said dowel body toward the front end and inclined at an angle to the axis of said dowel body, said dowel body and expansion member being engageable with one another to form an axially extending cylindrically shaped outer peripheral surface so that the dowel assembly can be inserted into a corresponding cylindrically shaped opening prior to being expanded, wherein the improvement comprises that said support surface is formed at least in part by a centrally arranged groove having oppositely disposed side walls, which groove extending inwardly into and in the axial direction of said dowel body from the location intermediate the front and rear ends of said dowel body toward the front end thereof and the bottom of said groove being inclined relative to the axis of said dowel body for displacing said expansion member radially outwardly from the axis of said dowel body as said expansion member is displaced along said groove in the direction toward the front end of said dowel body, and said expansion member is shaped to fit into said groove in said dowel body and in the insertion condition of said expansion dowel assembly the front ends of said dowel body and expansion member are arranged transversely of the axis of said dowel body and the lateral outer surfaces of said dowel body and expansion member in the insertion condition form a continuous cylindrical surface, said groove is U-shaped in cross-section transverse to the axial direction of said dowel body, the bottom of said groove is arc-shaped in transverse section, and the side walls of said groove extending upwardly from said bottom thereof decrease in height from the intermediate location toward the front end of said dowel body.

9. An expansion dowel assembly as set forth in claim 8, wherein the inwardly facing surfaces of said side walls of said groove extending upwardly from said bottom thereof are disposed in parallel relation.

10. An expansion dowel assembly, as set forth in claim 8, wherein said expansion member has a pair of laterally spaced side surfaces having increasing width from the rear end toward the front end of said expansion element and a ridge extending between said side surfaces and projecting outwardly from said side surfaces and having a configuration complementary to said groove in said dowel body.

11. An expansion dowel assembly comprising an axially extending dowel body having a front end and a rear end with the front end arranged to be inserted first into an opening into which the dowel assembly is to be inserted, and an axially extending expansion member having a front end and a rear end and arranged to be supported on said dowel body and to be displaced in the axial direction of said dowel body away from the rear end of said dowel body for anchoring said dowel body in the opening, said dowel body having engagement means adjacent the rear end thereof for applying axially directed forces to said dowel body, said dowel body having an axially extending support surface for said expansion member extending from a location intermediate the front and rear ends of said dowel body toward the front end and inclined at an angle to the axis of said dowel body, said dowel body and expansion member being engageable with one another to form an axially extending cylindrically shaped outer peripheral surface so that the dowel assembly can be inserted into a corresponding cylindrically shaped opening prior to being expanded, wherein the improvement comprises that said support surface is formed at least in part by a centrally arranged groove extending inwardly into and in the axial direction of said dowel body from the location intermediate the front and rear ends of said dowel body toward the front end thereof and the bottom of said groove being inclined relative to the axis of said dowel body for displacing said expansion member radially outwardly from the axis of said dowel body as said expansion member is displaced along said groove in the direction toward the front end of said dowel body, and said expansion member is shaped to fit into said groove in said dowel body and in the insertion condition of said expansion dowel assembly the front ends of said dowel body and expansion member are arranged transversely of the axis of said dowel body and the lateral outer surfaces of said dowel body and expansion member in the insertion condition form a continuous cylindrical surface, and said dowel body has an axially extending slot extending from the base of said groove to the outside surface of said dowel body.

* * * * *